US006616734B2

(12) United States Patent

Liu

(10) Patent No.: US 6,616,734 B2
(45) Date of Patent: Sep. 9, 2003

(54) DYNAMIC FILTRATION METHOD AND APPARATUS FOR SEPARATING NANO POWDERS

(75) Inventor: Jean H. Liu, Auburn, AL (US)

(73) Assignee: Nanotek Instruments, Inc.

( * ) Notice: Subject to any disclaimer, the term of this patent is extended or adjusted under 35 U.S.C. 154(b) by 0 days.

(21) Appl. No.: 09/949,550

(22) Filed: Sep. 10, 2001

(65) Prior Publication Data

US 2003/0047076 A1 Mar. 13, 2003

(51) Int. Cl.[7] .......................... B01D 65/08; B01D 50/00; B01D 45/12

(52) U.S. Cl. ............................ 95/282; 55/300; 55/337; 55/459.1; 55/518; 95/278; 210/321.63

(58) Field of Search .......................... 55/300, 337, 418, 55/459.1, 419, 479, 518; 95/278, 282; 96/422, 424, 425; 210/321.63, 321.75

(56) References Cited

U.S. PATENT DOCUMENTS

| | | | | |
|---|---|---|---|---|
| 3,334,471 A | | 8/1967 | Hoffstorm | |
| 3,643,800 A | | 2/1972 | Mansson | |
| 3,753,336 A | | 8/1973 | Drew | |
| 3,879,294 A | * | 4/1975 | Ellis et al. | 210/354 |
| 3,985,524 A | | 10/1976 | Masuda | |
| 4,149,861 A | | 4/1979 | Sogo | |
| 4,221,655 A | | 9/1980 | Nakayama | |
| 4,406,677 A | | 9/1983 | Obermeier | |
| 4,490,162 A | | 12/1984 | Davis | |
| 4,560,471 A | | 12/1985 | Yamada | |
| 4,604,192 A | | 8/1986 | Yamada | |
| 4,676,807 A | | 6/1987 | Miller et al. | |
| 4,759,782 A | | 7/1988 | Miller et al. | |
| 4,848,990 A | | 7/1989 | Matsui | |
| 5,016,823 A | | 5/1991 | Kato et al. | |
| 5,165,549 A | | 11/1992 | Kanda | |
| 5,236,479 A | | 8/1993 | Billingsley et al. | |
| 5,454,872 A | | 10/1995 | Lader | |
| 5,518,343 A | | 5/1996 | Howell | |
| 5,683,477 A | | 11/1997 | Jung | |
| 5,931,305 A | | 8/1999 | Akiyama | |
| 5,948,127 A | | 9/1999 | Minakawa | |
| 6,042,628 A | | 3/2000 | Nishikiori | |
| 6,117,322 A | * | 9/2000 | Miller et al. | 210/321.63 |
| 6,269,955 B1 | | 8/2001 | Morimoto et al. | |

* cited by examiner

*Primary Examiner*—Duane Smith
*Assistant Examiner*—Minh-Chau T. Pham

(57) ABSTRACT

A method and apparatus for separating nanometer-sized particles of a powder. The method includes (a) feeding the powder particles into a pressurized gas stream which carries the particles into a first stage filter device of a multiple-stage separator system; (b) operating the first stage filter device to remove and collect coarse particles and a filter device in at least another stage to remove and collect finer particles of the powder; the filter device having a dynamic filter which is composed of (b1) a mesh of a multiplicity of openings with the opening size at least two times larger than the average size of the particles, (b2) vibration devices or shakers to shake off the particles that may otherwise clog up the mesh openings, (b3) size sensors to measure the sizes of the particles collected by the filter devices, and (b4) a controller to regulate the operations of the shakers and sensors in order to form desired dynamic mesh holes for the purpose of filtering out the coarse particles in the first stage or the finer particles in another stage; and (c) operating a dust collector to exhaust the residual gas, allowing the finest particles of the powder to be separated and collected.

19 Claims, 4 Drawing Sheets

(B) Dynamic Meshes (A) Original Meshes

DYNAMIC FILTRATION METHOD AND APPARATUS FOR SEPARATING NANO POWDERS

Figure 1:
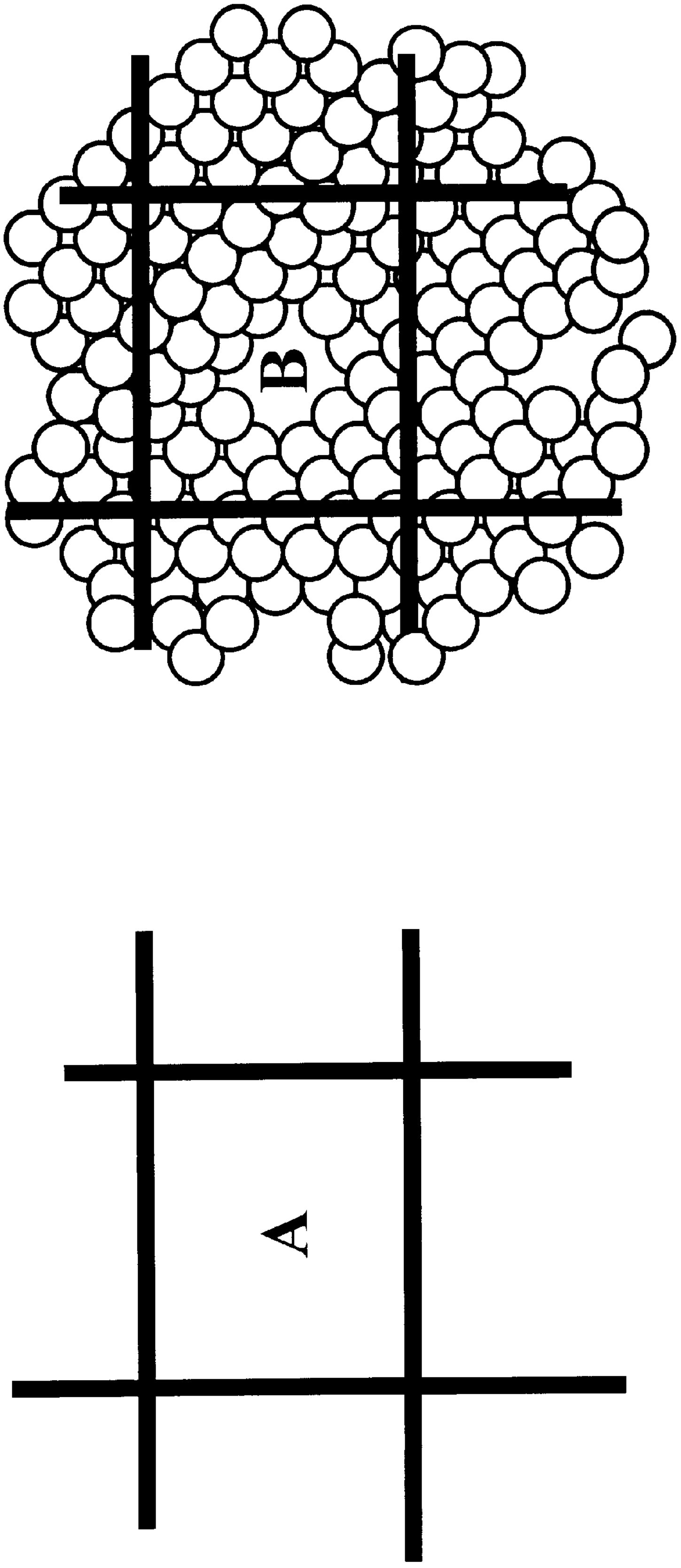

The present invention was a result of a research project supported by the US NSF SBIR program. The US government has certain rights on this invention.

FIELD OF INVENTION

The present invention provides a method and related apparatus for separating or classifying ultra-fine or nanometer-sized powder particles. The method and apparatus are effective in separating and classifying various nano-sized powders, which can be used in industrial or consumer products such as abrasives, chemical catalysts, agricultural chemicals, animal feeds, carbon & graphite, cement, ceramics, clay, coal & coke, construction materials, cosmetics, detergents, fertilizers, fillers, frits, enamels & glazes, food products & colorings, herbs & spices, industrial & specialty chemicals, insecticides & pesticides, marine feeds, metallic minerals & ores, metallic powders, oxides & compounds, minerals (non-metallic), paints, pigments & dye stuffs, pharmaceuticals, pulverized fuel ash, rare earth metals & compounds, refractory materials, resins & waxes, slags, surface coatings, and toners.

BACKGROUND OF INVENTION

Particle separators or classifiers for ultra-fine solid powders have a tremendous utility value. This is due to the unusually wide range of applications that ultra-fine powders, including nanometer-sized powders, have enjoyed. Nano-sized powders are essential ingredients in a broad array of both industrial and consumer products, listed above. In most of these applications, particles of well-defined sizes and/or a narrow size distribution are highly desirable for improved product performance.

Additionally, nano-sized metal powders are being considered for use as primers, propellants, and high explosive energetic materials. The particle size uniformity and homogeneity of particle mixing are two critical factors that hold the promise of further improving the performance of these metal powders. However, no method currently exists to guarantee the particle size uniformity in the desired range of nanometer sizes. Conventional mechanical methods of separation (e.g. metal screen sieves) are not feasible for separating particles at the nanometer scale. Current electrostatic charge and air-current methods are not capable of providing classification of nanometer-sized particles of an ultra-narrow size distribution as may be required of highly efficient and reliable energetic materials. An urgent need exists for an innovative method and equipment that are capable of precisely classifying nanometer-sized particles into groups of very narrow size ranges at a good production rate.

The following patents are believed to represent the state of the art of powder classifiers:

1. H. Morimoto, et al., "Air Current Classifying Separator," U.S. Pat. No. 6,269,955, Aug. 7, 2001.
2. S. Akiyama, "Powder Classifier," U.S. Pat. No. 5,931,305, Aug. 3, 1999.
3. W. A. Howell, "Dust-free Powder Substance Delivery and Filter System," U.S. Pat. No. 5,518,343, May 21, 1996.
4. H. Kanda, "Gas Current Classifying Separator," U.S. Pat. No. 5,165,549, Nov. 24, 1992.
5. M. Kato, et al., "Air Current Classifier, Process for Preparing Toner, and Apparatus for Preparing Toner," U.S. Pat. No. 5,016,823, May 21, 1991.

6. Y. Yamada, et al., "Powder Classifier," U.S. Pat. No. 4,604,192, Aug. 5, 1986 and U.S. Pat. No. 4,560,471, Dec. 24, 1985.
7. N. Nakayama, "Air Classifier," U.S. Pat. No. 4,221,655, Sep. 9, 1980.
8. Y. Sogo, "Cyclone Separator," U.S. Pat. No. 4,149,861, Apr. 17, 1979.
9. J. Drew, et al., "Centrifugal Separator Apparatus," U.S. Pat. No. 3,753,336, Aug. 21, 1973.
10. B. G. E. Mansson, "Apparatus for Separating Solids in a Whirling Gaseous Stream," U.S. Pat. No. 3,643,800, Feb. 22, 1972.
11. B. N. Hoffstrom, "Rotary Flow Classifier," U.S. Pat. No. 3,334,741, Aug. 8, 1967.
12. J. D. Miller, E. E. Koslow, K. W. Williamson, U.S. Pat. No. 4,676,807, Jun. 30, 1987 and U.S. Pat. No. 4,759,782, Jul. 26, 1988.
13. J. G. Billingsley, et al. "Cyclone Separator," U.S. Pat. No. 5,236,479, Aug. 17, 1993.
14. A. Matsui, "Dust Collector Adapted for Use in a Hopper Dryer," U.S. Pat. No. 4,848,990, Jul. 18, 1989.
15. C. Davis, "Low Pressure HEPA Filtration System for Particulate Matter," U.S. Pat. No. 4,490,162, Dec. 25, 1984.
16. H. J. Obermeier, "Dual Cyclone Dust Separator for Exhaust Gases," U.S. Pat. No. 4,406,677, Sep. 27, 1983.
17. H. J. Lader, "System for Controlling and Utilizing Finer Powder Particles in a Powder Coating Operation," U.S. Pat. No. 5,454,872, Oct. 3, 1995.
18. S. Masuda, "Electric Dust Collector Apparatus," U.S. Pat. No. 3,985,524, Oct. 12, 1976.
19. S. Nishikiori, et al. "Cyclone Type Dust Collector," U.S. Pat. No. 6,042,628, Mar. 28, 2000.
20. S. Minakawa, "Cyclone Dust Collector," U.S. Pat. No. 5,948,127, Sep. 7, 1999.
21. B. G. Jung, "Dust Collector Using Purse-Type Filter Cloth," U.S. Pat. 5,683,477, Nov. 4, 1997.

As indicated in the-above-cited patents, various techniques for separating and classifying powders have been proposed. One of such conventional techniques, known as powder classifier, provides a rotor for classifying powders by using the rotation of the rotor and airflow. The rotor spins at a high speed inside a casing with the rotor being equipped with a plurality of powder classifying vanes swirling around, while ventilating the rotor from the periphery to the center. The airflow and the centrifugal force caused by the rotation act on the powder flow to classify the powder particles in accordance with the boundary defined by a desired particle size.

More specifically, an air introduction path is formed to be directed toward the inside of the rotor from the position where the powder classifying vanes are provided, and a powder introduction port or powder intake is formed above the classification rotor along the circumference thereof from which powder particles fall onto the powder classifying vanes. A powder supply port is provided on the upper center of a casing for supplying the powder as a raw material. The powder supplied is fed from the powder intake to the powder classifying vanes within the rotor, i.e., fed into a classification chamber while being scattered on the upper surface of the rotor. In the classification chamber, the centrifugal force of the powder classifying vanes and the air flowing into the center of the rotor act on the powder. In other words, fine powder particles with a small diameter that is very susceptible to air viscous resistance are carried by the airflow to the central portion and taken out from a fine powder outlet, while coarse powder particles having a large diameter that is very susceptible to the centrifugal force are scattered to the outer edge of the classification rotor by the centrifugal force and collected to a coarse powder outlet provided on the outer peripheral of the rotor. The powder is thus classified in accordance with the boundary defined by a desired particle size.

Such a conventional powder classifier is also provided with a balance rotor, unitarily with the classification rotor, so that the air passing through the classification rotor is introduced through the balance rotor from the center of the classification rotor into the fine powder outlet provided in the outer edge of the classification rotor. The balance rotor is provided with a view to regulating the flow of air passing through the classification rotor or a vent cavity or ventilating the vent cavity smoothly so that the powder can be classified in accordance with the desired value.

Since in the conventional classifier the balance rotor is coupled to the lower portion of the classification rotor, the flow can be balanced in the vertical direction. Such a balance rotor, however, makes the entire mechanism of the powder classifier complicated and the rotor large scale to increase the weight. The heavy rotor causes an increase in output of a drive mechanism for driving the rotor to rotate. Further, since in the powder classifier the vent path from the classification rotor to the balance rotor is bent substantially at 180 degree and the sectional area of the path is increased from the center to the circumference, the ventilating speed is reduced and hence the classified powder particles could be accumulated or adhere to the inner surface of the vent path. The powder particles adhered may cause lowered permeability or clogging of the vent path. Because the entire mechanism is complicated, it is difficult to disassemble the classification rotor and it takes much time to clean the inside of the classification rotor for keeping its sanitary conditions or remove clogging powder particles from the vent path.

Akiyama, et al [Ref.2] provided a powder classifier using a classification rotor capable of classifying powder with high efficiency and high accuracy. The classification rotor is attached to a rotating shaft as a body and rotatably supported in a casing. Within the classification rotor, a cavity is formed from the outer edge to the center and classifying vanes are provided around the circumference. The cavity is bent downwardly near the center with the lower end connected through a fine powder passage to a fine powder outlet. The outer edge of the classification rotor is connected to a coarse powder outlet. After feeding powder from a powder supply port, the powder is rotated by the classifying vanes such that coarse powder particles are taken out from the rough outlet by centrifugal force and fine powder particles are taken out by airflow from the fine powder outlet.

Morimoto et al [Ref.1] developed a powder classifier to reduce the classification point for classifying powder. The classifier includes a classifying cover having a conical bottom surface, a classifying plate provided under the classifying cover and having a conical top surface opposite the conical bottom surface of the classifying cover, and a plurality of louvers provided annularly around a classifying chamber defined between the conical bottom surface and the conical top surface to define passages for secondary air. The conical bottom surface is inclined at a larger angle than the conical top surface.

Kanda, et al [Ref.4] provided a separator for classifying powder with air current. The separator includes a classifying chamber and an introduction section for introducing powder into the classifying chamber, a powder feeding inlet for feeding powder formed at the upper portion of the classifying chamber, a cone-shaped classifying plate with a high central portion formed at the lower portion of the classifying chamber, a coarse powder discharging outlet for discharging coarse powder provided at the lower brim outer periphery of the classifying plate, a fine powder discharging outlet for discharging fine powder provided at the central portion of the classifying plate, a gas in-flower for dispersing powder by whirling gas provided at the upper outer periphery of the classifying chamber, and a gas inflow inlet for creating a whirling current of gas for classifying powder provided at the lower portion of the classifying chamber. When the powder starting material flowing into a classification chamber is fluidized in a whirl in said classification chamber, centrifugal force and air resistance force in the inward direction act on the respective particles of the powdery starting material, and the classification point is determined by the balance between the centrifugal force and the air resistance force.

At the outer periphery of the classification chamber, larger particles are whirled, while smaller particles whirl inside thereof. By providing powder-discharging outlets respectively at the center and the outer periphery of the lower portion of the classifying chamber, the fine powder group and the coarse powder group can be collected separately (classification). In such a classifying separator, it is important that the starting powder should be sufficiently dispersed within the classifying chamber to become primary particles in enhancing the classification precision. As this kind of classifying separator, an litani system classifying separator or Kuracyclon has been proposed. However, in this type of classifying separator, it is very difficult to control the classification point, to and involves such problems such as poor dispersion and poor classification precision when there is high dust concentration. In order to solve such problems, various proposals have been made [e.g., Ref.6]. As a classifying separator practically applied, there may be mentioned a commercially available classifying separator sold under the name of DS separator. In this kind of classifying separator, although it has become possible to control the classification point, since powder is fed through a cyclone section into the classifying chamber, the powder is concentrated before entering the classifying chamber, whereby dispersion of the powder tended to become insufficient.

The result of a through literature search indicates that existing powder classifiers or separators are not effective in classifying powder particles smaller than 10 microns. Most of the commercially available separators are not designed for or capable of separating nanometer-sized powder particles at all. An urgent need exists for the development of both general-purpose and highly specialized nano powder separators that are of good accuracy.

Therefore, an object of the present invention is to provide a method and related apparatus that are capable of separating nanometer-sized powder particles.

Another object of this invention is to provide a method and apparatus for classifying a powder into separate groups of nanometer-sized particles with at least one group consisting of only particles within a very narrow size range.

Still another object of this invention is to provide a multi-stage powder separator apparatus that is capable of classifying a nano powder into several groups of nanometer-sized particles with each group consisting of particles within a narrow size range.

Summary of Invention

As one of the preferred embodiments of the present invention, a nano powder-separating or powder-classifying method includes:

(a) feeding the powder particles into a pressurized gas stream which carries the particles into a first stage filter device of a multiple-stage separator system;

(b) operating the first stage filter device to remove and collect coarse particles and a filter device in at least another stage to remove and collect finer particles of the powder; the filter device having a dynamic filter which is composed of (b1) a mesh of a multiplicity of openings with the opening size at least two times larger than the average size of the particles, (b2) vibration devices or shakers to shake off the particles that may otherwise clog up the mesh openings, (b3) size sensors to measure the sizes of the particles collected by the filter devices, and (b4) a controller to regulate the operations of the shakers and sensors: in order to form desired dynamic mesh holes for the purpose of filtering out the coarse particles in the first stage or the finer particles in another stage; and (c) operating a dust collector to exhaust the residual gas, allowing the finest particles of the powder to be separated and collected.

Preferably, the particle size signals acquired by the sensor are fed back to the controller for the purpose of adjusting the operation, on demand, of the vibration devices or shakers to achieve the desired dynamic mesh holes. Further preferably, the shaking motion of the vibration devices is regulated by the controller to vary the amplitude, frequency, direction, and/or waveform of the shaking motion to achieve the desired dynamic mesh holes. The feeding rate of the powder particles is preferably adjustable under the command of the controller. The multiple stage filter devices are operated in a closed-loop control fashion that powder particles whose diameters, d, fall within a narrow range, $d_{min} \leqq d \leqq d_{max}$, can be readily collected. Preferably, at least a collector container is capable of collecting particles where $(d_{max}-d_{min}) \leqq 50$ nanometers. Further preferably, the particles are very narrow in size distribution: $(d_{max}-d_{min}) \leqq 20$ nanometers.

In one of the preferred embodiments, a multiple-stage powder separator apparatus for separating nanometer-sized particles of a powder is composed of the following major components:

(a) a powder feeder;

(b) at least a first stage filter device in flow communication with the powder feeder to receive powder particles therefrom; the filter device including (b1) a casing, (b2) at least a flexible filtering mesh inside the casing with mesh openings at least two times larger than the average size of the particles to be separated; the filtering mesh and the casing together forming a first outer cell therebetween and a first inner cell inside the filtering mesh, the first inner cell being in flow communication with the powder feeder;

(b3) a rotor equipped with a plurality of powder classifying vanes being inside the inner cell and swirling around an axis of this rotor, which is driven by a first motor; the swirling vanes driving fine particles smaller than a predetermined size to permeate through the mesh openings to enter the first outer cell, leaving behind coarse particles inside the first inner cell;

(b4) vibration device in shaking relation to the flexible filtering mesh to form dynamic mesh holes;

(b5) a controller in control relation to the vibration devices;

(b6) a first powder collector in flow communication with the first inner cell to receive the coarse powder particles therefrom;

(b7) particle size sensors, in electronic communication with the controller, to measure the sizes of the particles and feed the acquired size signals to the controllers through an amplifier-driver unit; and (c) a dust collector in flow communication with the at least first stage filter device to receive the fine particles therefrom. The dust collector is composed of a dust filter to filter out finer particles and a collector container to collect the finer particles, permitting the residual gas to exhaust through the dust filter.

Preferably, the above-described apparatus further includes at least a second stage filter device in flow communication with the first stage filter device on one end and with the dust collector on another end of the at least a second stage filter device (can have 3, 4 or any number of stages as desired). The second stage filter device preferably has a similar construction as the first stage one, also including a casing, a flexible filtering mesh, a rotor, a shaker, a size sensor, and a powder collector container. This second particle size sensor is used to determine the sizes of relatively larger-sized particles (that are not able to permeate through the flexible filter mesh in the second stage) and feed the acquired size signals to the controller.

The powder feeder is preferably composed of a hopper receive the powder, a feeding gear with one end being in flow communication with the hopper to receive powder particles therefrom and another end to output particles at a desired rate, a pressurized air inlet communication with the output end of the feeding gear to receive powder particles therefrom for forming a powder-gas mixture stream that enters the inner cell of the first stage filtering device. This feeding gear is preferably under the command of the controller so that the powder feeding rate can be adjusted in real time during the powder separating process. Preferably, the casing and the inner cell in each filter device is approximately conical in shape, tapering down from a larger upper-portion diameter to a smaller lower-portion diameter. The controller preferably includes an amplifier and driver unit for driving the vibration devices with adjustable vibration amplitude, frequency, direction, and/or waveform.

LIST OF DRAWINGS

FIG. 1 A diagram to illustrate the basic concept of the dynamic filtration method (DFM).

Figure 2:
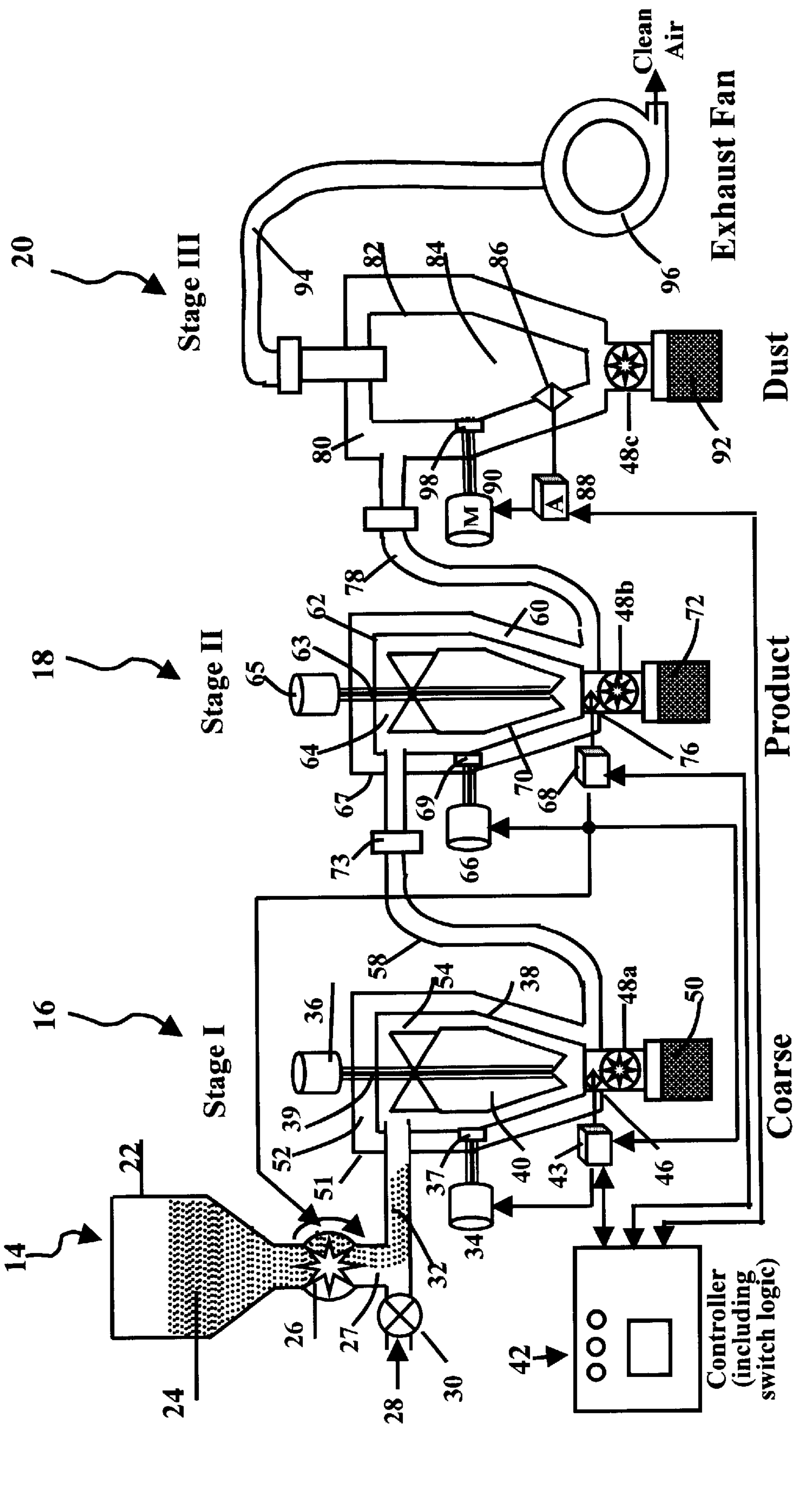

FIG. 2 A schematic of a three-stage nano powder separator system.

Figure 3:
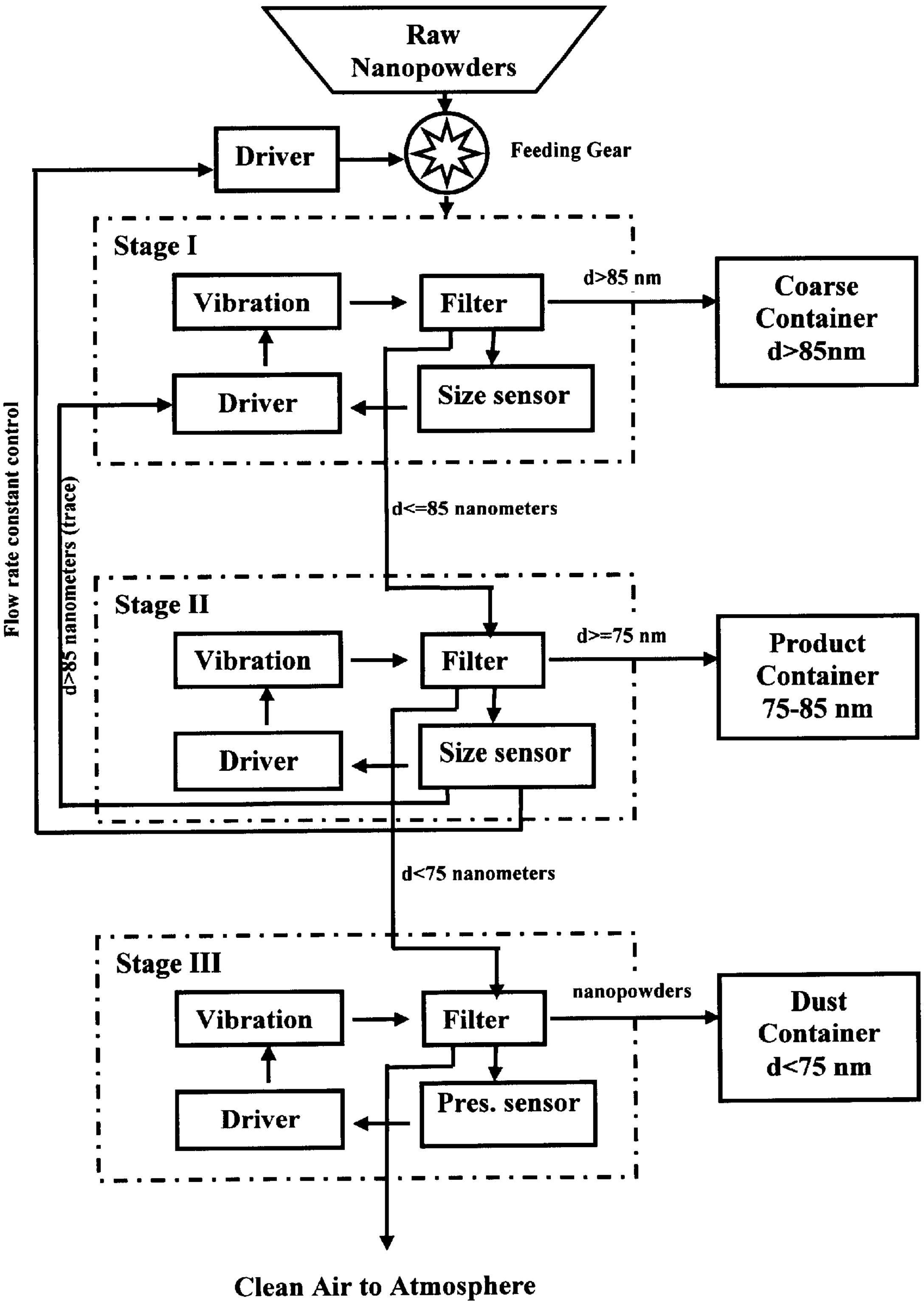

FIG. 3 A flow chart to illustrate how a three-stage nano powder separator system work.

Figure 4:
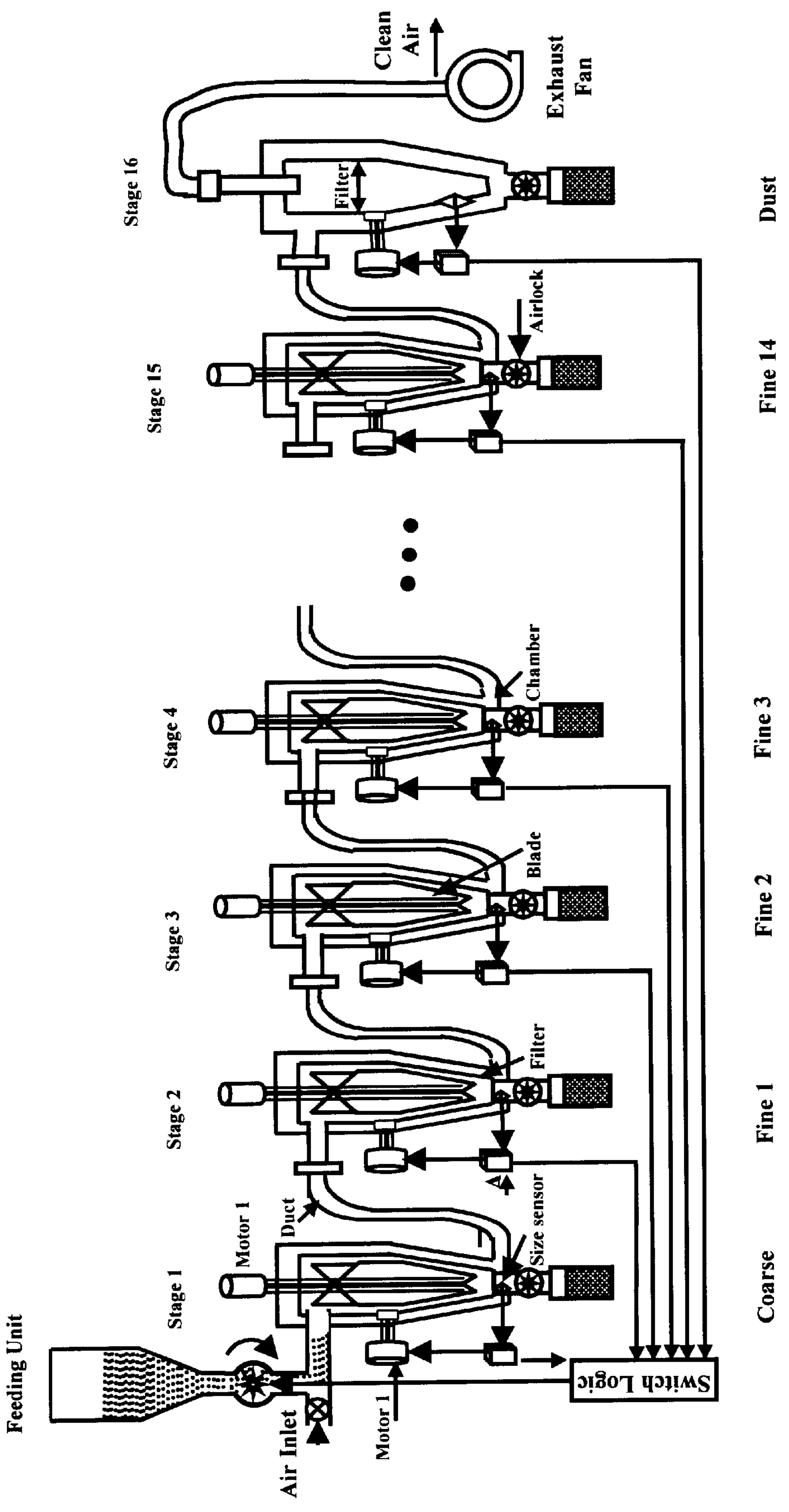

FIG. 4 A schematic of a 16-stage nano powder separator system.

DESCRIPTION OF PREFERRED EMBODIMENTS

The invented dynamic filtration method (hereinafter referred to as DFM) may be best illustrated by referring to FIG. 1. The key to this method is the utilization of a dynamic filter with original mesh openings being much larger than the sizes of the nano-sized particles to be separated. Our past work experience with the production and collection of nano powders has shown that even if a filter with exceedingly large mesh openings (e.g., 0.2–0.3 mm in equivalent diameter) was used for filtering the particles as small as 10 nm in diameter, the mesh openings could be quickly clogged up by these nano-sized particles when the particle-air stream passes through these openings and provided that the filter remained stationary (not under any vibration or shaking action). When a vibration force was applied to the filter, the clogged mess openings could be readily reopened allowing the filtering process to continue in a dynamic fashion. The DFM is based on this concept of dynamic filtering.

FIG. 1 (*a*) schematically shows a mesh on a filter 10, which can be a screen with cross-woven wires or bars 14. The size of this mesh opening, denoted by the letter A in FIG. 1(A), is preferably 2–10 times bigger than the particle size of the powders that are to be separated. If the mesh opening size were only slightly greater than the particle size, the separation would not work well in the air classifier because all the mesh openings would be clogged up in a few seconds. It is, therefore, desirable to use much bigger original mesh openings. Even with much bigger meshes, the openings would be soon clogged up by the particles in the particles-air stream. However, if a mechanical vibration or shock wave is applied to the clogged meshes, the clogging particles will be shaken off the mesh and a small hole (denoted by B in dynamic meshes 12 shown in FIG. 1(B)) will appear near the center of every mesh. The size of this small hole, hereinafter referred to as a "dynamic mesh size", depends on the vibration parameters such as vibration amplitude. The greater the amplitude, the bigger the dynamic mesh size is. By adjusting the vibration amplitude one can obtain the desired dynamic mesh size. Hence, the particles of different sizes can be separated by filtering out the air-driven particles through various desired dynamic mesh holes and this filtering method is called a dynamic filtration method.

The next logical question to ask is how to control the size uniformity of the dynamic mesh holes. The size uniformity was found to mainly depend on the vibration waveform and the vibration direction. But, the following parameters also affect the particle size uniformity: vibration frequency, the size of original meshes, the size distribution of the particles to be separated, air pressure difference between the inside and outside of a filter, centrifugal force of the particles in an air current classifier, and type of particles. These observations are further described in the following two design examples which are used to illustrate the invented method and apparatus:

EXAMPLE I

In most of the cases, nano powders produced in current technologies do not have a uniform size. Instead, a powder normally has a size distribution, e.g., between 5 nm and 100 nm. For the purpose of illustration, assume that a nano powder sample has most of its particles being in a relatively narrow size range, e.g., around 80+/−20 nanometers (60 nm<d<100 nm). In this case, this size of 80 nm is called the average size. Only a small amount of the particles would deviate far away from the average size, e.g. 60 nm or smaller and 100 nm or bigger. Hence, the separator device will be required just to collect the powder particles near the average size and remove the particles whose size is either above a specified value (e.g., 90 nm) or below another specified value (e.g., 70 nm). Such a device having an accuracy of +/−10 nm thus far has been non-existing.

The present invention, however, provides a method and apparatus that is capable of meeting or exceeding this stringent powder separation requirement. A three-stage separator has been designed and constructed as schematically shown in FIG. 2. This separator consists of a feeding unit, Stage I unit, Stage II unit, and Stage III unit (or "dust" collector unit). The operation of this separator system is further illustrated in a flow chart (FIG. 3).

The feeding unit 14 is used to feed a powder to the DFM separator. It mainly consists of a hopper 22 to contain the raw powder particles 24, an air inlet 28 connected to a compressed gas source, an air valve 30, and a feeding gear 26 with a control motor (not shown). The motor speed can be adjusted to regulate the powder feeding speed. The air valve 30 functions as an airflow rate regulator and a pressure controller. The feeding gear 26 driven by its motor delivers powder particles, at a desired flow rate, from the hopper 22 to a duct 27 located under the bottom of the feeding gear. The powder particles coming to the duct will meet the compressed air from the air inlet 28 through the air valve 30. At this meeting location 32, the compressed air and the powders will mix and form a dispersed particle stream in the duct. The duct will lead the particle stream to the Stage I unit 16 for the removal of coarse particles.

As shown in FIG.2, the Stage I unit 16 consists of a tapered (conical) chamber housing or casing 51, a tapered filter mesh 38, a blade rotor 39 driven by a first motor 36, a second motor 34 driving a vibration device 37, a particle size sensor 46, a controller 42 (containing an amplifier and driver unit 43), an optional rotary airlock **48*a* and a powder collector container 50. The rotor 39 is equipped with a plurality of powder-classifying vanes or blades 40 which, when rotating around a rotor axis, will generate a force field that tends to drive the finer particles to permeate through a flexible filter mesh 38. This flexible filter mesh 38 preferably also conical in shape with mesh openings on the side wall and top wall, and much larger-sized openings on the bottom wall. These bottom openings could be just one big opening connected to the rotary airlock 48*a*** through a duct.

Specifically, the particle stream, under an air pressure, will come from the abovementioned feeding unit 14 into an inner cell 54 inside the tapered, flexible filter mesh 38. The particles in the stream will spin on the axis of the blade rotor due to the rotation of the blade rotor driven by the first motor 36. At this moment, the spinning particles experience two forces: an air drag force and a centrifugal force. In the meantime, the filter stays in the status of vibration induced by the vibration device 37 driven by the second motor 34 in such a fashion that dynamic mesh holes will be formed in the filter. Under this condition, the finer particles will go through the dynamic mesh holes of the filter to the outside (outer cell 52) of the filter and be led to the Stage II unit 18 through a duct 58, while the coarse particles will be introduced into the collector container 50 located at the bottom of Stage I unit 16 through the rotary airlock **48*a*. A size sensor 46 is mounted on the passage between the rotary airlock 48*a* and the tapered filter mesh 38. The particle size sensor can be based on a laser or other high-intensity rays. These particle size sensors, well-known in the art and commercially available, are used to precisely measure the sizes (including size distributions) of the passing particles. The size signal is amplified by the amplifier-driver unit 43 of the controller 42, which also receives a signal from a corresponding sensor 76 of the Stage II unit 18. These signals will be used to control the second motor 34** so that desired vibration waveform, amplitude, frequency, and direction are obtained to achieve the desired size uniformity of the dynamic mesh holes formed. In this fashion, the coarse particles bigger than a specified size can be removed completely.

More specifically, the size sensor system in the Stage I unit is capable of providing a particle size cut-off point; say 85 nm as an example. Based on the dynamic mesh size concept, those particles larger than 85 nm will not pass through the dynamic holes formed. However, one cannot rely solely on the sensor 46 of the Stage I unit to assist in achieving the size uniformity because this sensor can only be used to measure the size of the powder particles that go into the collector container 50 of the Stage I unit. The sensor 46, providing size signals, is unable to guarantee the effect of the filter vibration on the size uniformity of the dynamic mesh holes. In other words, the Stage I unit cannot rely on its size sensor alone to control the vibrational mode because the sensor 46 does not know the size uniformity of the dynamic mesh holes. (The sensor provides only the knowledge on the sizes of the coarse particles collected in the container 50) In this situation, it is possible that some dynamic mesh holes are bigger than 85 or even 100 nm, particularly in the beginning of a powder separation process, due to the lack of an optimal vibration mode. As a consequence, some particles bigger than 85 nm could go through the filter 38 and enter the inner cell of the Stage II unit. Therefore, it is desirable to use additional size signals from the sensor 76 in Stage II that will send out the particle size distribution signal of those larger particles escaped through the filter 38 of the Stage I. If the sensor 76 in the Stage II determines that the size of some particles is over 85 nm, it will send this signal to controller 42 which will command the amplifier-driver unit 43 in the Stage I to further regulate the vibration mode so that an optimal vibration effect can be achieved and the size uniformity of the dynamic holes in the filter 38 can be obtained.

The Stage II unit 18 is similar to the Stage I unit 16 in terms of the main components and configuration. The Stage II unit has a rotor 63 which is driven by a motor 65. The rotor is also equipped with a multiplicity of vanes 70 inside the inner cell 64 of a flexible dynamic filter 62. Between the chamber housing or casing 67 and the filter 62 is the outer cell 60, which is in flow communication with the Stage III unit 20 through a conduit 78. A vibration device or shaker 69, driven by a motor 66, is attached to the filter 62, providing a vibrational motion thereto to form dynamic mesh holes thereon. Connected to the bottom of the inner cell 64 and in flow communication therewith is a conduit that houses an optional rotary airlock device **48*b*. This conduit allows those larger sized particles, which are inside the inner cell 64 and not able to permeate through the filter 62, to go through the rotary airlock and be collected by a collector container 72. A particle size sensor 76** is used to measure the sizes of these larger particles passing through this conduit.

The major differences in functions between the Stage I and Stage II are described in what follows. The Stage II unit is used for the collection of the nano powder products with a desired size range (e.g., 75–85 nm). When the size sensor 76 detects the presence of particles over a desired size value (e.g., 85 nm), it will send a signal to the controller 42, which will in turn command the amplifier-driver unit 43 in the Stage I unit to reduce the vibration amplitude and change the vibration mode in the Stage I unit so as to decrease the dynamic hole size in the filter 38 of the stage I unit. This could help prevent the bigger sized particles (>85 nm) from going through the Stage-I filter 38 into the outer cell 52 and eventually into the inner cell 64 the Stage II unit.

When the sensor 76 in the Stage II detects the existence of some particles in the particle stream with a size value below the desired value (e.g., 75 nm), the size signal will be sent to its motor 66 to increase the vibration amplitude and change the vibration mode of the shaker 69 so that the dynamic hole sizes will be increased to allow smaller sized powders (<75 nm) to go through its filter 62 (and not to be collected by the product container 72 of the Stage-II unit so that the container 72 would not collect any particle smaller than 75 nm). If the sensor 76 in the Stage II unit determines that all the particles have a size over a value (e.g., >75 nm), i.e., no particle is sized 75 nm or bigger, but we desire to have a particle size range of 75 nm–85 nm. Then, the size signals will be sent to the controller that commends the Stage-II amplifier-driver unit to regulate its motor 66 in order to decrease the vibration amplitude and change the vibration mode. In this way, the dynamic mesh hole size will be reduced so that those powder particles (between 75 nm and 85 nm) will not permeate through the filter mesh of the Stage II unit, but instead enter the product container 72. In this fashion, the collector container 72 collects only those particles with a diameter between 75 nm and 85 nm (i.e., 75 nm≦d≦85 nm). By a similar design, a collector container can collect nano particles within a predetermined size range; e.g., $d_{min}\leqq d\leqq d_{max}$, where preferably $(d_{max}-d_{min})\leqq 50$ nanometers and further preferably $(d_{max}-d_{min})\leqq 20$ nanometers. No prior-art powder classifier is capable of separating powder particles with such a high degree of accuracy.

The Stage II unit preferably also performs a self-regulating function; i.e., the particle flow rate in the particle stream of Stage II can be measured by a flow rate sensor 73 and/or the same sensor 76. The flow rate signal will be sent to the feeding gear motor 26 to control the powder-feeding rate so that no excessive amount of powders would be trying to pass through the Stage II unit at the same time.

The Stage III unit 20 is a "dust" collector; herein the word "dust" meaning extremely fine particles. Dust collectors are well-known in the art [e.g., Ref.14–21]. Most of the commercially available dust collectors can be adapted for use in the present invention. A simple but effective dust collector is schematically shown on the right hand side of FIG. 2. The dust collector 20 consists of a housing or casing that houses a filter 82, with the space between the casing and the filter defining an outer cell 80 and the space inside the filter defining an inner cell 84. Preferably, a vibration device 98 is attached to the filter mesh 82. This vibration device is actuated by a motor or actuator 90, which is powered by a amplifier-driver unit 88. Preferably, the dust collector further comprises a pressure sensor 86 to measure the pressure differential between the inner cell and the outer cell. The outer cell 80 is in flow connection to a rotary airlock **48*c*, which allows the extremely fine particles (but not fine enough to go through the filter mesh 82; essentially only residual air or gas can pass through this mesh) to get collected by a dust container 92 located under the bottom of the whole unit. The residual gas will be pumped out into the open air through a conduit 94 by an exhaust fan 96 (FIG. 2**).

The amplifier-driver 88 is also electronically connected to the controller 42, which controls the function of the amplifier-driver 88. The output of the amplifier-driver 88 is connected to the motor or actuator 90. The particle stream (containing extremely fine particles) from the stage II unit 18 passes through a conduit 78 and enters the outer cell 80 (not the inner cell 84) of the Stage III unit 20. The powder particles will be filtered on the outer surface of the filter mesh 82 in the unit. The motor or actuator 90 drives the filter mesh to undergo vibrations and the powder particles (cumulated on the outer surface of the mesh 82 while the residual gas permeates through the mesh holes) will be shaken off from the filter mesh and allowed to enter the dust container 92 through the rotary airlock **48*c*. The pressure sensor will check the pressure difference between the outside and the inside of the filter mesh. If the pressure difference were excessively high, this would mean that the dynamic mesh holes have been clogged up by the aggregated particles. Then a signal will be sent to the motor or actuator 90** through the amplifier to increase the vibration amplitude for restoring the dynamic mesh holes to the "open" status so that the clean air will be able to go through the mesh and be pumped out into the outside atmosphere.

EXAMPLE II:

In some industrial cases, the nano powders have a wide size distribution, e.g., from 20 nm to 180 nm. Assume that the nano powder particles need to be classified into different size ranges, such as 20–30 nm, 30–40 nm, . . . , and 170–180 nm. A separator has been designed for this purpose. As schematically shown in FIG. 4, the whole system consists of 16 stages of separating units, in addition to a materials-feeding unit and a switch logic control unit. The configurations and functions of these 16 separating units and the feeding unit are similar to those described earlier in the three-stage system.

The nano powder particles are fed to the Stage 1 unit from the feeding unit and the coarse particles are removed and relocated to the container located under the Stage 1 unit. Then, the particle stream enters the Stage 2 unit with the fine particles being sorted out and retained in the container located under the bottom of the Stage 2 unit. The finer particles will be collected in the container located under, the Stage 3, and still finer particles collected by the collector container of Stage 4 unit, and so on. The finest particles will be in the container located under the Stage 16, which is a dust collector. The particle size cut-off points at different stages can be adjusted in their corresponding amplifier-driver units through the logic control unit. Every current stage unit will provide the size signal to the controller, which integrates the acquired size signals along with the size signals acquired by its next neighboring unit so that the size uniformity of the dynamic mesh holes in the current stage unit can be obtained. Preferably all the powder flow rate signals are sent to the switch logic control unit. The biggest flow rate signal will be used for controlling the speed of the feeding gear so as to accomplish an optimal powder separation effect.

The above two examples serve only to illustrate the preferred embodiments of the present invention. While the description of these examples contains many specific points, the reader should not construe these as limitations on the scope of the invention, but merely as exemplifications of preferred embodiments thereof Those skilled in the art will envision many other possible variations are within its scope.

What is claimed:

1. A method for separating nanometer-sized particles of a powder, comprising:

(a) feeding said powder particles into a pressurized air or gas stream which carries said particles into a first stage filter device of a multiple-stage separator system;

(b) operating said first stage filter device to remove and collect coarser particles of said powder that are larger than a first desired size and operating at least a second stage filter device to remove and collect finer particles of said powder that are larger than a second desired size, allowing the finest particles smaller than said second desired size in the gas stream to enter a dust collector means; at least one of said filter devices comprising a dynamic filter which comprises (b1) a mesh of a multiplicity of openings with an opening size at least two times larger than the average size of said particles, (b2) vibration means to shake off particles that may otherwise clog up said mesh openings, (b3) size sensor means to measure the sizes of the particles collected by at least one of said filter devices, and (b4) control means to regulate the operations of said vibration means and said size sensor means in order to form desired dynamic mesh holes for the purpose of filtering out said coarser or finer particles; and (c) operating said dust collector means to separate and collect the finest particles and to exhaust the residual gas.

2. The method of claim 1, wherein the particle size signals acquired by said sensor means are fed back to said control means for the purpose of adjusting the operation, on demand, of said vibration means to achieve said desired dynamic mesh holes.

3. The method of claim 1, wherein the shaking motion of said vibration means are regulated by said control means to vary the amplitude, frequency, direction, and/or waveform of said shaking motion to achieve said desired dynamic mesh holes.

4. The method of claim 1, wherein said feeding of powder particles is effected by feeding means in which the feeding rate is regulated by said control means.

5. The method of claim 1, wherein one of said multiple stages is operated to collect powder particles whose diameters, d, fall within a narrow range, $d_{min} \leqq d \leqq d_{max}$, where $(d_{max}-d_{min}) \leqq 50$ nanometers.

6. The method of claim 5, wherein $(d_{max}-d_{min}) \leqq 20$ nanometers.

7. A multiple-stage powder separator apparatus for separating nanometer-sized particles of a powder, said apparatus comprising:

(a) powder feeder means;

(b) at least a first stage filter device in flow communication with said powder feeder means to receive powder particles therefrom; said filter device comprising casing means;

at least a flexible filtering mesh inside said casing means with mesh openings at least two times larger than the average size of said particles to be separated; said filtering mesh and said casing means forming a first outer cell therebetween and a first inner cell inside said filtering mesh, said first inner cell in flow communication with said powder feeder means;

rotor equipped with a plurality of powder classifying vanes being inside said inner cell and swirling around an axis of said rotor, said rotor being driven by a first motor means; said swirling vanes driving fine particles smaller than a first desired size to permeate through said mesh openings to enter said first outer cell, leaving behind coarser particles inside said first inner cell;

vibration means in shaking relation to said flexible filtering mesh to form dynamic mesh holes;

control means in control relation to said vibration means;

first powder collector in flow communication with said first inner cell to receive said coarser powder particles therefrom;

particle size sensor means in electronic communication with said control means to measure the sizes of said coarser particles and feed the acquired size signals to said control means; and (c) dust collector means in flow communication with said at least first stage filter device to receive said fine particles therefrom, said dust collector means comprising a dust filter to filter out finest particles of desired sizes and a collector container to collect said finest particles, permitting the residual gas to exhaust through said dust filter.

8. The apparatus of claim 7, further comprising at least a second stage filter device in flow communication with said first stage filter device on one end and with said dust collector means on another end of said at least a second stage filter device.

9. The apparatus of claim 8, wherein said second stage filter device comprises:

second casing means;

a second flexible filtering mesh inside said second casing means, said second filtering mesh and said second casing means forming a second outer cell therebetween and a second inner cell inside said second filtering mesh, said second inner cell in flow communication with the outer cell of said first stage filter device to receive said fine particles therefrom;

second rotor equipped with a plurality of powder classifying vanes being inside said second inner cell and swirling around an axis of said second rotor, said second rotor being driven by a second motor means; said swirling vanes driving finer particles smaller than a second desired size to permeate through the mesh openings of said second filtering mesh to enter said second outer cell, leaving behind larger-sized particles with a diameter larger than said second predetermined size inside said second inner cell;

second vibration means in shaking relation to said second flexible filtering mesh to form dynamic mesh holes; said second vibration means communicating electronically with said control means;

a second powder collector in flow communication with said second inner cell to receive said larger-sized powder particles therefrom; and second particle size sensor means, in electronic communication with said control means, to measure the sizes of said larger-sized particles and feed the acquired size signals to said control means.

10. The apparatus of claim 7, wherein said powder feeder means comprises hopper means to receive said powder, feeding gear means with one end being in flow communication with said hopper means to receive powder particles therefrom and another end to output particles at a desired rate, pressurized air inlet means in flow communication with said output end of the feeding gear means to receive powder particles therefrom for forming a powder-gas mixture stream that enters the inner cell of said first stage filtering device.

11. The apparatus of claim 10, wherein said feeding gear means communicates electronically at with said control means.

12. The apparatus of claim 7, wherein said inner cell is approximately conical in shape, tapering down from a larger upper-portion diameter to a smaller lower-portion diameter.

13. The apparatus of claim 7, wherein said control means comprises an amplifier and driver unit for driving said vibration means with variable vibration amplitude, frequency, direction, and waveform.

14. The apparatus of claim 9, wherein said powder feeder means comprises hopper means to receive said powder, feeding gear means with one end being in flow communication with said hopper means to receive powder particles therefrom and another end to output particles at a desired rate, pressurized air inlet means in flow communication with said output end of the feeding gear means to receive powder particles therefrom for forming a powder-gas mixture stream that enters the inner cell of said first stage filtering device.

15. The apparatus of claim 14, wherein said feeding gear means communicates electronically with said control means.

16. The apparatus of claim 9, wherein said first or second inner cell is substantially conical in shape, tapering down from a larger upper-portion diameter to a smaller lower-portion diameter.

17. The apparatus of claim 9, wherein said control means comprises an amplifier and driver unit for driving said vibration means in said first and/or second stage filter unit with variable vibration amplitude, frequency, direction, and/or waveform.

18. The apparatus of claim 9, further comprising at least a third stage filter device having one end in flow communication with said second stage filter device and another end in flow communication with said dust collector means.

19. The method of claim 1, further comprising operating a flow rate sensor to measure the flow rate of particles passing into said at least another stage.

* * * * *